UNITED STATES PATENT OFFICE.

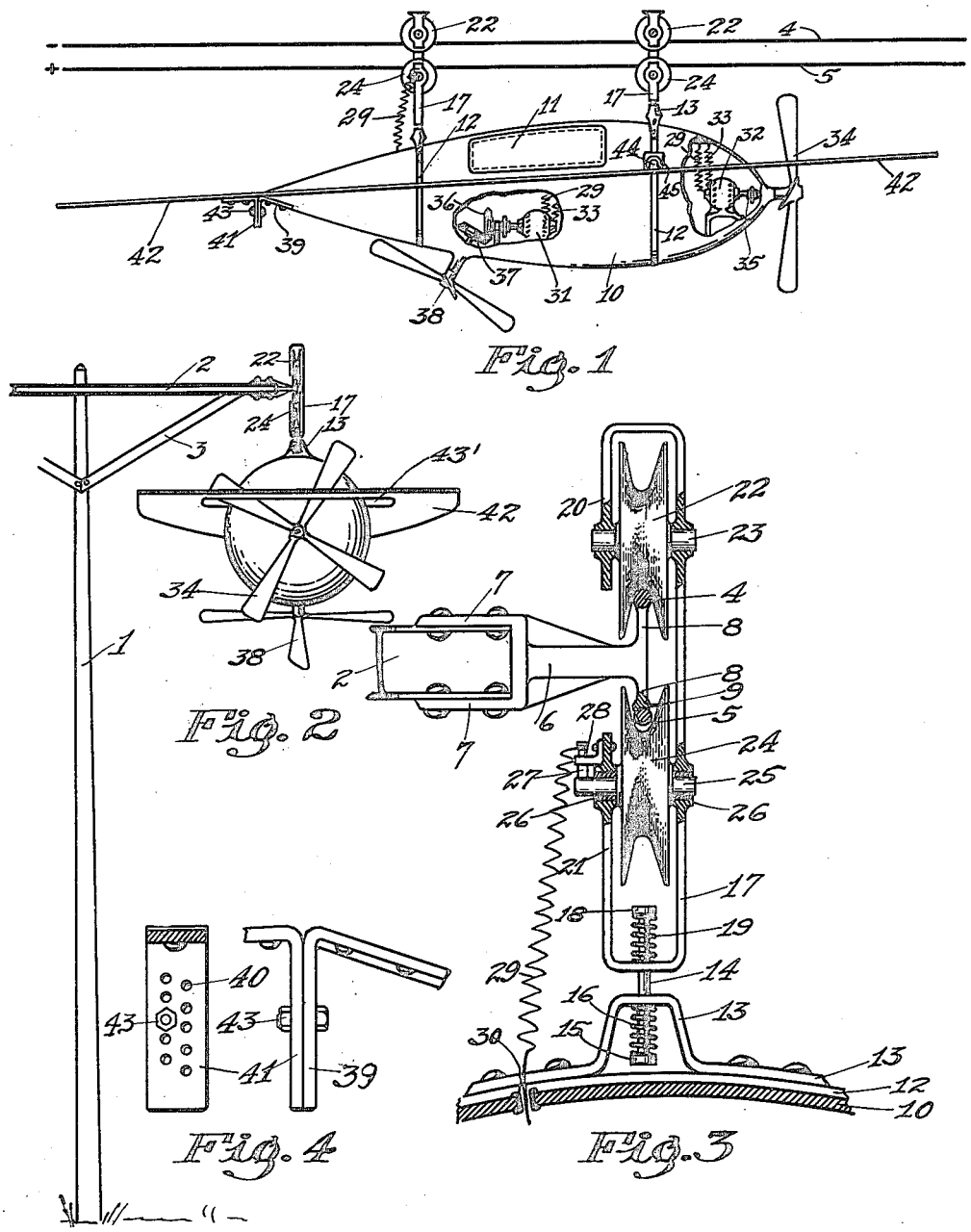

EDWARD WARD HAYS, OF RIVERSIDE, ALABAMA, ASSIGNOR OF ONE-HALF TO J. B. ROBERTSON, OF SEDDON, ALABAMA.

OVERHEAD TRANSPORTING MEANS.

1,140,327. Specification of Letters Patent. Patented May 18, 1915.

Application filed April 24, 1914. Serial No. 834,270.

*To all whom it may concern:*

Be it known that I, EDWARD W. HAYS, a citizen of the United States of America, residing at Riverside, in the county of St. Clair and State of Alabama, have invented certain new and useful Improvements in Overhead Transporting Means, of which the following is a specification.

My invention consists in a novel overhead means for the transportation of mail, packages and passengers by a car which is suspended from and guided by an aerial track and provided with air propelling means to drive it. The suspended car may have its air propelling means so disposed as to both sustain the car and propel it in its direction of travel. Also the car may have an aeroplane attachment which will coöperate in sustaining the weight of the car when in motion and will provide a safety means to permit the car to glide to the earth in the event of breakage of its overhead guiding and supporting means. The plane may be adjusted if desired.

My preferred type of overhead guide for the car comprises a pair of spaced superposed cables which coöperate with rollers on the car to control its tendency to rise or fall. If desired the two part suspension or guide means may serve as conductors for electric current to operate the driving machinery for the propellers.

My invention further comprises the details of construction and arrangement of parts hereinafter more particularly described and claimed, reference being had to the accompanying drawings, in which:—

Figure 1 is a side elevation of the car broken away to formally illustrate its driving machinery. Fig. 2 is an end elevation of the overhead suspension means and an aeroplane car mounted thereon. Fig. 3 is a detail view enlarged of the hanger means on the car. Fig. 4 is a detail view illustrating the means for adjusting the aeroplane.

Similar reference numerals refer to similar parts throughout the drawings.

I have illustrated my invention for a double track system which comprises supporting posts 1 of any suitable character which are anchored in the ground and carry at their top a cross bar 2 formed preferably of a metallic I-beam and insulated by the post. The outer ends of the bar are strengthened by braces 3 and carry each a horizontal support for the cables 4 and 5. The support is preferably formed by heavy strong casting 6 having flanges 7 which are bolted to the top and bottom faces of the beam 2. Each support at its outer end carries reversely disposed integral webs 8 which are grooved to receive, and have fastened thereto, the cables 4 and 5. Insulation 9 is used to insulate the lower web from the upper. The cables 4 and 5 may be suitably connected up respectively with the terminals of an electric generator (not shown) for the purposes of supplying energy to motors carried by the suspended car 10.

The car 10 may have any desired shape which will offer a low resistance to the air and is made hollow to receive packages, mail or passengers through a removable door 11. Preferably the car is cigar shaped and is surrounded near each end with a reinforcing metal strap 12, to which is bolted a steel plate 13 bent up at its center and perforated to receive a bolt 14. Each of these bolts 14 slides freely through the hole in plate 13 and carries at its lower end a nut or washer 15 which serves as a seat for a heavy strong coiled spring 16 which is interposed between said seat and the plate and surrounds the bolt. In like manner the upper end of the bolt slides freely through an aperture in the bottom of a bent iron bar forming a hanger 17, the upper end of the bolt carrying a nut or washer 18 and being surrounded by a coiled spring 19 interposed between the nut and the hanger. This furnishes a strong, yielding and non-rigid connection between the car and its hangers. The iron bar forming the hanger 17 has its upper end 20 bent over horizontally and then at right angles parallel with its main body portion. In like manner the lower end 21 of the bar is bent under and upwardly in line with the end 20, but leaving a wide clearance between the ends of 20 and 21. A flanged pulley 22 has its axis 23 journaled in the top of the hanger and a similar pulley 24 has its axis 25 journaled in a Babbitt or other nonconducting bearing 26 in the lower portion of the hanger. The pulleys are spaced so that their center portions receive between them the cables 4 and 5, the pulley flanges being wide enough to prevent them jumping away from the cables and yet leaving a sufficient clearance to prevent the possibility of their contact with the cable supports. The hanger may be made of very heavy steel or reinforced in any suitable manner to give it the requisite strength.

The axis 25 for one of the lower pulleys extends beyond its bearing at one end and is there engaged by a brush 27 mounted on a block 28 suitably insulated from and connected to the hanger. A wire 29 leads from the brush down through an opening 30 in the car and connects with one of the terminals of electric motors 31 and 32. The other terminals of these motors are connected by wires 33 to the frame of the car which is in circuit with cable 4.

As my preferred propelling means, I use two air propellers of any standard design suitable for aeroplane work, the forward propeller 34 being mounted on a horizontal shaft 35 which is driven by motor 32 and projects through the forward end of the car. The motor 31 drives a beveled gear 36 which meshes with a like gear 37 on a rearwardly inclined shaft which passes through suitable bearings on the car and supports the rear propeller 38 which is disposed so as to impart both a lifting and forward driving motion to the car. At the rear end of the car I mount a heavy angle plate 39 provided with bolt holes 40. An angle plate 41 is connected to the aeroplane 42 near its rear end and is vertically adjustably connected to the plate 39 by bolts 43. This areoplane extends forward at a slight upward inclination, surrounding the car and having an opening 43' for the propeller 34. Also it has on each side a trunnion 44 which is journaled in a bearing 45 on the side of the car. The areoplane extends about the car in all directions, being preferably longer than it is wide to give it the desired surface area without requiring the cars to be overhung too far from the posts 1.

In operation, the car is initially supported by the pulley 22 and hanger 17 from the cable 4. As it speeds up under the action of its propellers the weight of the car on the cable 4 is gradually reduced both by the lifting of the propeller 38 and of the areoplane 42, which parts are designed and adjusted to sustain any desired percentage of the total weight of the car under its normal speed of operation. When in full flight both cables 4 and 5 and both pulleys 22 and 24 will be required to guide the car and prevent it dipping or rising, and at the same time they deliver motive power to the car to drive it. Any other power machinery may be used and also other arrangements may be devised to utilize other forms of suspension means to guide the car in its flight and control its tendency to dip or rise, and I desire to claim any such means broadly, as those I have shown are merely my preferred construction.

Having thus described my invention, what I claim as new and desire to secure by Letters Patent, is:—

1. In combination, a car, an aerial suspension means therefor comprising a pair of superposed spaced cables, hanger means on the car comprising roller supports which receive said cables between them, said supports being flanged and held by their flanged edges against disengagement from said suspension means and being spaced to cause only one at a time to engage the suspension means.

2. In an aerial conveyer, an overhead track, supports therefor, a car, means to suspend and guide the car by engagement with said track, power driven propelling means carried by the car, and a gliding plane hinged to and surrounding the car.

3. In combination, an aerial car having a supporting plane and motor driven air propellers, an overhead track, means on the car which are adapted to engage and follow said track, said plane being in one piece, means to hinge the formed end of the plane to the car, and means to adjustably connect the rear end of the plane to the car, substantially as described.

4. In combination, an aerial car having a rigid supporting plane, means to angularly adjust said plane surrounding it, motor driven air propeller means, an overhead track, and means on the car which are adapted to engage and follow said track.

5. In combination, a car, a guiding plane adjustably connected to and surrounding the car, said plane having a transverse slot in its forward end, a lifting propeller and a forward driving propeller carried by the car, the lifting propeller being below the plane and the forward driving propeller disposed within the slot in the plane, power means to drive said propellers, and means to guide the car comprising a suspended way and superposed rollers on the aeroplane which receive said way between them.

6. In combination, an aerial car, fixed supports, rollers on the car adapted to engage said supports, a supporting plane surrounding the car and adjustably connected thereto, said plane having a transverse slot near the forward end of the car, and a propeller mounted in the car and having its blades disposed to pass through said slot and make it effective both above and below the plane.

7. In combination, an aerial car, fixed supports, rollers on the car adapted to engage said supports, a supporting plane surrounding the car and adjustably connected thereto, said plane having a transverse slot near the forward end of the car, a propeller mounted in the car and having its blades disposed to pass through said slot and make it effective both above and below the plane, and means to adjust the rear end of the plane to vary its angular inclination to a horizontal plane, substantially as described.

In testimony whereof I affix my signature in presence of two witnesses.

EDWARD WARD HAYS.

Witnesses:
J. T. McAllister,
Nomie Welsh.